Patented Sept. 5, 1933

1,925,947

UNITED STATES PATENT OFFICE 1,925,947

MANUFACTURE OF RESINS PRIMARILY OBTAINED FROM POLYHYDRIC ALCOHOLS AND POLYBASIC ACIDS

William Baird and Eric Everard Walker, Blackley, Manchester, England, assignors to Imperial Chemical Industries Limited, Westminster, England No Drawing. Application June 28, 1930, Serial No. 464,701, and in Great Britain July 3, 1929

7 Claims. (Cl. 260—8)

The present invention relates to resinous compositions of the polyhydric alcohol-polybasic acid type.

It is well known that these resins may be improved in certain respects by the incorporation of fatty oils or of the fatty acids derived from fatty oils. The incorporation of fatty oil acids, e. g., that from tung oil, is brought about quite easily, but on the other hand, the fatty oils themselves, with the exception of hydroxylated oils such as castor oil and rape seed oil, can only be incorporated with difficulty and by the use of special methods, as they do not readily form homogeneous masses with resins of the type referred to herein. We have now discovered means whereby the proportion of non-hydroxylated fatty oil which can be incorporated into polyhydric alcohol-polybasic acid resins can be considerably increased, so that the properties of the resins are modified in a very desirable manner.

The process of manufacture in accordance with the present invention comprises the use of a hydroxylated fatty oil, e. g., castor oil, which can be directly incorporated into the resins and is miscible with other fatty oils as a vehicle whereby the said non-hydroxlated fatty oils may be homogeneously commingled with the resins. Castor oil and similar hydroxylated oils are easily incorporated into resins of the polyhydric-alcohol-polybasic acid type in all proportions, and the amount of non-hydroxylated oil such as olive oil and drying oil which can then be further incorporated with the resin depends on the proportion of castor oil present. It is known that the nature both of the polyhydric alcohol used in the preparation of the "Glyptal" resin and also of the non-hydroxylated oil itself have a marked effect as regards the proportion of the latter which may be added, e. g., a glycol phthalate resin permits of the addition of more drying oil than a glycerol phthalate resin and tung oil is more easily incorporated than linseed oil. The proportion of non-hydroxylated oil which can be added without affecting the homogeneity of the mixture can also be increased by substitution of part of the polybasic acid used in the preparation of the resin by a mono-basic acid or by substituting part of the polyhydric alcohol used in the preparation of the resin by a monohydric alcohol such as butyl or benzyl alcohol, but whatever means are employed to increase the proportion of drying oil which can be incorporated in these resins, the addition of castor oil or other hydroxylated oils will still further increase that proportion, besides conferring on the film an increased flexibility, which is much more permanent than that conferred by drying oils alone.

Our new resins are usually clear, reddish-yellow in colour, tacky and very tough and pliable. Films from solutions of the resins have the property of drying in the air to give non-tacky flexible films the physical properties of which depend on the nature of the components employed.

The preparation of the resin may be carried out in a covered vessel provided with a suitable exit for the gaseous reaction products and fitted with a mechanical stirrer. The ingredients, i. e., the polyhydric alcohol, polybasic acid and hydroxylated oil, without the non-hydroxylated oil are heated until a homogeneous mass is obtained and then the non-hydroxylated oil is added in suitable quantities at a time, each lot being thoroughly incorporated with the mass before further addition is made. If all the materials are heated directly together, the non-hydroxylated oil may sometimes prevent the incorporation of the castor oil the solid resin forming and separating out from the oily mixture; we therefore do not recommend this method where large proportions of said drying oil are to be incorporated.

The following examples illustrate means of carrying out our invention but are not limitative. The parts are by weight.

*Example 1*

| | Parts |
|---|---|
| Glycerol | 31 |
| Phthalic anhydride | 74 |
| Castor oil | 75 |
| Tung oil | 50 |

The glycerol, phthalic anhydride and castor oil are heated to 210–220° C. in a covered vessel with a small exit for the reaction vapours, and the melt stirred slowly. When a clear solution is obtained 10 parts of tung oil are added and when the solution clears a further 10 parts are added. Similar additions of the tung oil are made until the whole has been incorporated, then the temperature of the mass is raised to and maintained at 240° C. until it nears the gel stage as shown by the viscosity.

The product is a clear deep straw coloured resin, soft, tacky and very tough and pliable.

*Example 2*

|  | Parts |
|---|---|
| Glycol | 20 |
| Glycerol | 21 |
| Phthalic anhydride | 99 |
| Castor oil | 48 |
| Linseed oil | 40 |

The first four components are heated under reflux to 185–195° C. stirring slowly, and when a homogeneous solution is obtained the drying oil is added in quantities of 5 parts waiting until the melt clears. When all the linseed oil is added the temperature is maintained at 185–195° C. for 3 hours. The condenser is then removed and the mass heated at 220–230° C. for about 6 hours, the resulting resin is a soft solid, which, however, when used as a varnish dried rather less rapidly than the resin obtained according to Example 1.

What we claim is:

1. A process which comprises heating together a polyhydric alcohol, an organic polybasic acid and a hydroxylated oil, and further heating the reaction mixture with a non-hydroxylated oil until resinification takes place.

2. A process which comprises heating together a polyhydric alcohol, an organic polybasic acid and a hydroxylated oil selected from the class consisting of castor oil and rape seed oil until a homogeneous mass is obtained, adding a drying oil to the mass and continuing the heating until resinification takes place.

3. A process which comprises heating together glycerol, phthalic anhydride and a hydroxylated oil, and further heating the reaction mixture with a non-hydroxylated oil until resinification takes place.

4. A method of incorporating drying oil into a glycerol phthalate resin which comprises heating together glycerol, phthalic anhydride and castor oil until a homogeneous mass is obtained, adding a portion of the drying oil and continuing adding the remaining portions thereof as the solution clears after each added portion, and continuing the heating until resinification takes place.

5. A polyhydric alcohol-polybasic acid resin comprising the reaction product of a non-hydroxylated fatty oil and an organic polybasic acid partially esterified with a polyhydric alcohol and a hydroxylated oil.

6. A polyhydric alcohol-polybasic acid resin comprising the reaction product of a non-hydroxylated fatty oil and phthalic anhydride partially esterified with glycerol and a hydroxylated oil.

7. A polyhydric alcohol-polybasic acid resin comprising the reaction product of a non-hydroxylated fatty oil and phthalic anhydride partially esterified with glycerol and castor oil.

WILLIAM BAIRD.
ERIC EVERARD WALKER.